(12) United States Patent
Ishikawa (10) Patent No.: US 12,519,765 B2
(45) Date of Patent: Jan. 6, 2026

(54) INFORMATION PROCESSING APPARATUS, METHOD FOR CONTROLLING THE INFORMATION PROCESSING APPARATUS, AND STORAGE MEDIUM

(71) Applicant: CANON KABUSHIKI KAISHA, Tokyo (JP)

(72) Inventor: Akira Ishikawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 164 days.

(21) Appl. No.: 18/459,661

(22) Filed: Sep. 1, 2023

(65) Prior Publication Data
US 2024/0080310 A1 Mar. 7, 2024

(30) Foreign Application Priority Data
Sep. 1, 2022 (JP) ................................. 2022-138906

(51) Int. Cl.
*H04L 9/40* (2022.01)
*G06F 21/60* (2013.01)

(52) U.S. Cl.
CPC ............ *H04L 63/08* (2013.01); *G06F 21/608* (2013.01); *H04L 63/20* (2013.01); *H04L 2463/082* (2013.01)

(58) Field of Classification Search
CPC ................................ H04L 63/20; H04L 63/08
USPC .......................................................... 726/4
See application file for complete search history.

(56) References Cited

U.S. PATENT DOCUMENTS

| | | | |
|---|---|---|---|
| 2008/0063002 A1* | 3/2008 | Zheng | H04W 84/10 370/401 |
| 2015/0213258 A1* | 7/2015 | Masui | G06F 21/45 726/26 |
| 2016/0261719 A1* | 9/2016 | Ezaki | H04L 41/0663 |
| 2019/0222612 A1* | 7/2019 | Nainar | H04L 12/4633 |
| 2022/0236933 A1* | 7/2022 | Takeda | H04L 63/101 |
| 2022/0239799 A1 | 7/2022 | Hosoda | |

FOREIGN PATENT DOCUMENTS

JP 2019155610 A 9/2019

* cited by examiner

*Primary Examiner* — Michael S McNally
(74) *Attorney, Agent, or Firm* — Canon U.S.A., Inc., IP Division (57) ABSTRACT

An information processing apparatus configured to communicate with an external information processing apparatus is configured to determine, based on the information processing apparatus having communicated with the external information processing apparatus, whether information indicating a global Internet Protocol (IP) address is included in an IP header of a communication packet in the communication, and perform control to issue a warning about a predetermined authentication setting in a case where it is determined that the information indicating the global IP address is included, and the predetermined authentication setting is not made on the information processing apparatus, and so as not to issue the warning about the predetermined authentication setting in a case where it is determined that the information indicating the global IP address is not included.

16 Claims, 10 Drawing Sheets

INFORMATION PROCESSING APPARATUS, METHOD FOR CONTROLLING THE INFORMATION PROCESSING APPARATUS, AND STORAGE MEDIUM

BACKGROUND

Field

The present disclosure relates to an information processing apparatus that appropriately controls notification corresponding to a usage environment.

Description of the Related Art

Information processing apparatuses need measures against unauthorized access from malicious attackers. In a case where only an operation unit mounted on an information processing apparatus is a means of operation, a risk of unauthorized access can be reduced by strictly restricting entry to a room in a building in which the information processing apparatus is installed. In a case where the information processing apparatus provides a means of remote control via a network and limits a remote control terminal to those in a specific network segment, such as a company intranet, a measure is to separate the network segment from the Internet. Separation from the Internet can be achieved by operating the information processing apparatus in a private network completely isolated from the Internet or by installing a properly configured firewall at a network boundary. A minimum authentication function is required even in a case where these room entry restriction and Internet separation are provided.

In a case where the information processing apparatus allows a remote control via the Internet, unauthorized access cannot be prevented by boundary defense type measures, such as room entry restriction and Internet separation, so that it is necessary to protect the information processing apparatus using a security function of its own.

As a strong authentication measure that an information processing apparatus can perform, Japanese Patent Application Laid-Open Publication No. 2019-155610 discusses multi-factor authentication. Multi-factor authentication is a mechanism that prevents spoofing by performing a check using a combination of two or more of knowledge information, possession information, and biometric information.

Japanese Patent Application Laid-Open Publication No. 2019-155610 discusses a technique for switching whether to perform multi-factor authentication according to a degree of confidentiality of information handled by a device serving as a connection destination of an information processing apparatus. However, according to Japanese Patent Application Laid-Open Publication No. 2019-155610, the technique does not consider switching between issuance and not-issuance of a warning about an authentication setting depending on a network environment and a communication partner that follow the setting of the information processing apparatus.

For example, in a case where a communication partner of an information processing apparatus has a global Internet Protocol (IP) address (i.e. a public IP address), the communication partner is most likely present on the Internet rather than in a private network. The global IP address is a unique address that is finite in the world and is expensive to maintain, so that it is not normally used within a private network. Thus, in a case where an information processing apparatus communicates with a communication partner having a global IP address, the information processing apparatus can be considered as an apparatus connecting to the Internet that needs to be particularly protected with a security function of the apparatus itself.

SUMMARY

The present disclosure is directed to the provision of a mechanism for appropriately issuing a warning about an authentication setting in consideration of a network environment of an information processing apparatus.

According to an aspect of the present disclosure, an information processing apparatus configured to communicate with an external information processing apparatus is configured to determine, based on the information processing apparatus having communicated with the external information processing apparatus, whether information indicating a global Internet Protocol (IP) address is included in an IP header of a communication packet in the communication, and perform control to issue a warning about a predetermined authentication setting in a case where it is determined that the information indicating the global IP address is included and the predetermined authentication setting is not made on the information processing apparatus, and so as not to issue the warning about the predetermined authentication setting in a case where it is determined that the information indicating the global IP address is not included.

Further features of the present disclosure will become apparent from the following description of exemplary embodiments with reference to the attached drawings.

DESCRIPTION OF THE EMBODIMENTS

Embodiments of the present disclosure will be described below with reference to the accompanying drawings. It is noted that the following embodiments are not meant to limit the scope of the present disclosure as encompassed by the appended claims. Further, not all combinations of features described in the embodiments are essential for solving means of the present disclosure. In the following embodiments, a multifunction peripheral (MFP) provided with a printer is described as an example of an information processing apparatus. According to a first embodiment, a configuration is described in which a security notification related to an authentication setting is transmitted to a user after detection of communication that includes a global Internet Protocol (IP) address in a packet header. The information processing apparatus according to the present disclosure is not limited to an MFP. The information processing apparatus may be, for example, a personal computer (PC), a server, a router, or a network camera each of which has a multi-factor authentication function.

Figure 1:
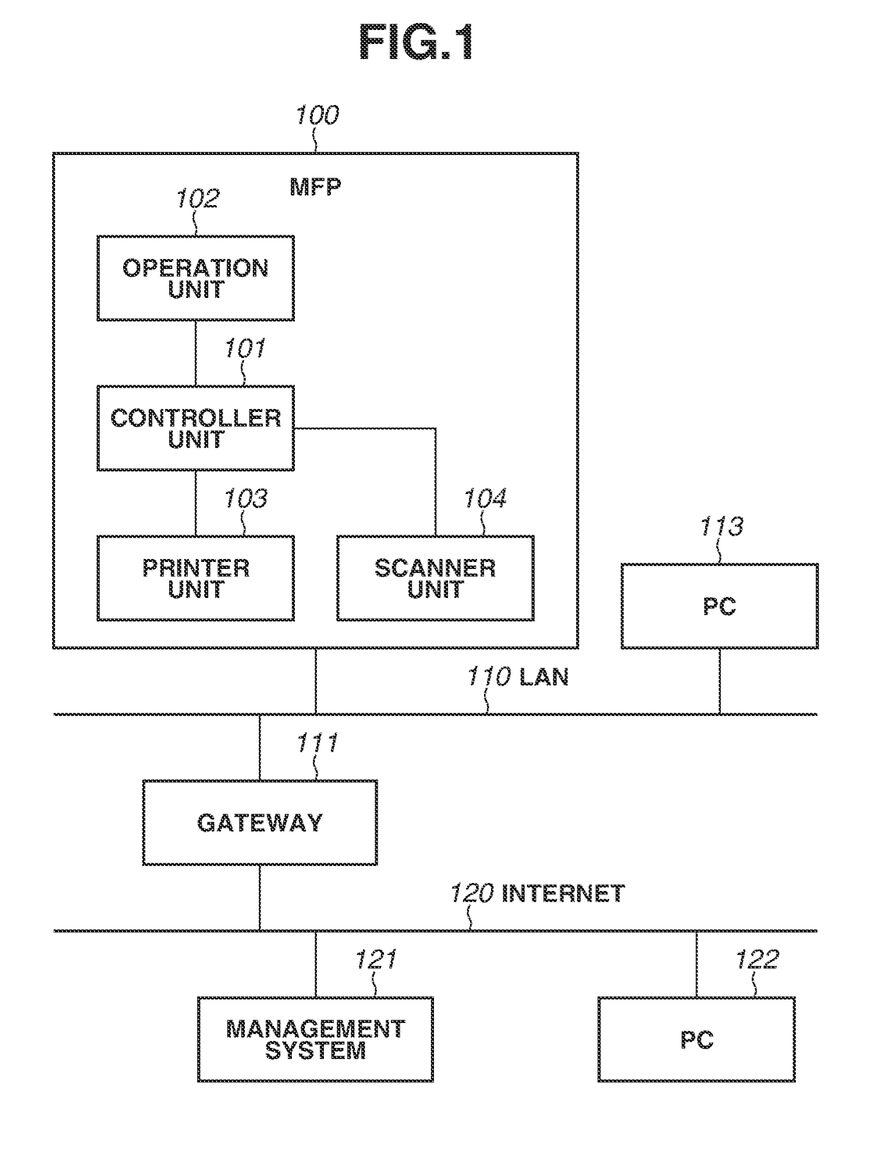
FIG. 1 is a block configuration diagram illustrating a connection form of a multifunction peripheral (MFP) according to an embodiment.

FIG. 1 is a block diagram illustrating a connection form between an MFP, a gateway, a management system, and a PC according to the present disclosure. An MFP 100, a management system 121, and a PC 122 are connected via a local area network (LAN) 110, a gateway 111, and the Internet 120. The MFP 100 and a PC 113 are connected via the LAN 110. The MFP 100 can communicate with an external information processing apparatus via the Internet 120 and the LAN 110.

The MFP 100 includes an operation unit 102 that performs input and output with a user. The MFP 100 includes a printer unit 103 that outputs electronic data to a paper medium. The MFP 100 includes a scanner unit 104 that reads a paper medium and converts it into electronic data. The operation unit 102, the printer unit 103, and the scanner unit 104 are connected to a controller unit 101 and realize functions as a multifunction peripheral according to control by the controller unit 101.

The gateway 111 is a network router that relays communication from the MFP 100 to the Internet 120.

The PC 113 and the PC 122 are work terminals that transmit print jobs to the MFP 100 and perform remote control. The MFP 100 is capable of receiving a print job from the PC 113 and transmit scan data to the PC 113. The MFP 100 can also perform admin settings relating to a network and security via a remote user interface (UI) displayed on the PC 113 as remote control. As the remote control, the MFP 100 is able to add, register, delete, and edit an address book including e-mail addresses that are settable to a transmission destination to which scan data is to be transmitted. The management system 121 is an apparatus that checks information about the MFP 100 via the Internet 120.

Figure 2:
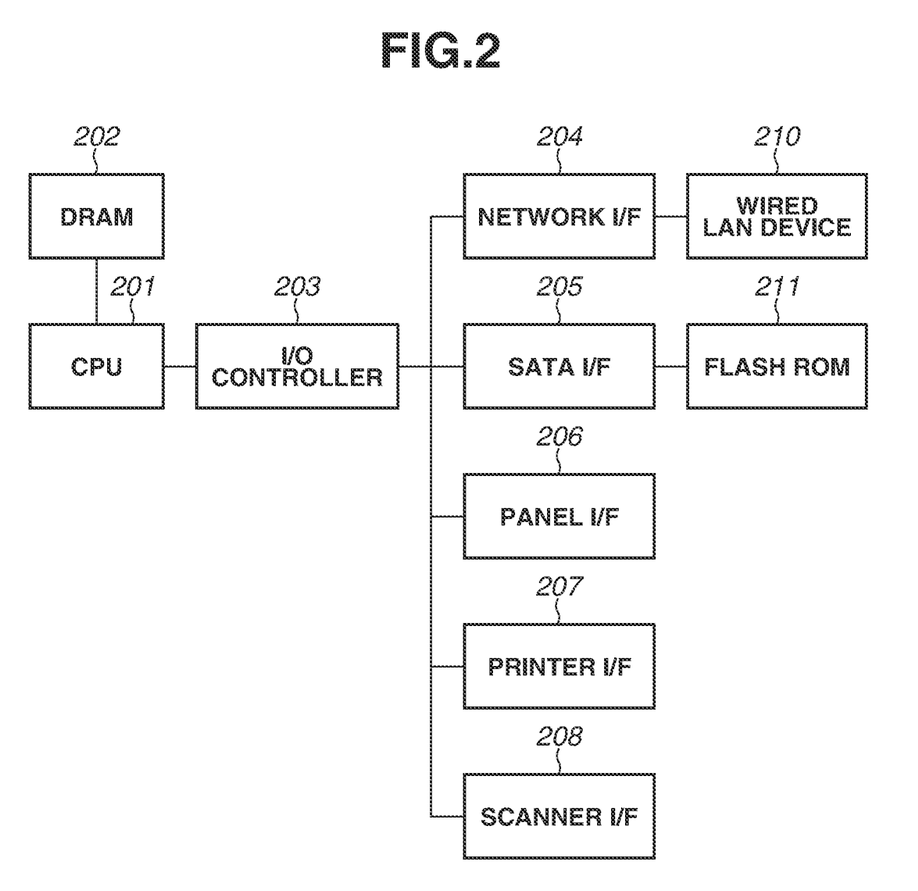
FIG. 2 is an internal configuration diagram of a controller unit of the MFP.

FIG. 2 is a block diagram illustrating details of the controller unit 101 of the MFP 100. A central processing unit (CPU) 201 performs main arithmetic processing in the controller unit 101. The CPU 201 is connected to a dynamic random access memory (DRAM) 202 via a bus. The DRAM 202 is used by the CPU 201 as a working memory for temporarily allocating program data representing an operation instruction and data to be processed while the CPU 201 performs calculation. The CPU 201 is connected to an input/output (I/O) controller 203 via a bus. The I/O controller 203 performs input and output with respect to various devices according to an instruction from the CPU 201. The I/O controller 203 is connected to a Serial Advanced Technology Attachment (SATA) interface (I/F) 205 to which a Flash read-only memory (ROM) 211 is connected. The CPU 201 uses the Flash ROM 211 to permanently store a program and a document file for realizing a function of the MFP 100. The I/O controller 203 is connected to a network OF 204. A wired LAN device 210 is connected to the network OF 204. The CPU 201 realizes communication on the LAN 110 by controlling the wired LAN device 210 via the network OF 204. A panel OF 206 is connected to the I/O controller 203, and the CPU 201 realizes input and output to a user to the operation unit 102 via the panel OF 206. A printer OF 207 is connected to the I/O controller 203, and the CPU 201 realizes output processing of outputting a paper medium using the printer unit 103 via the printer OF 207.

Figure 3:
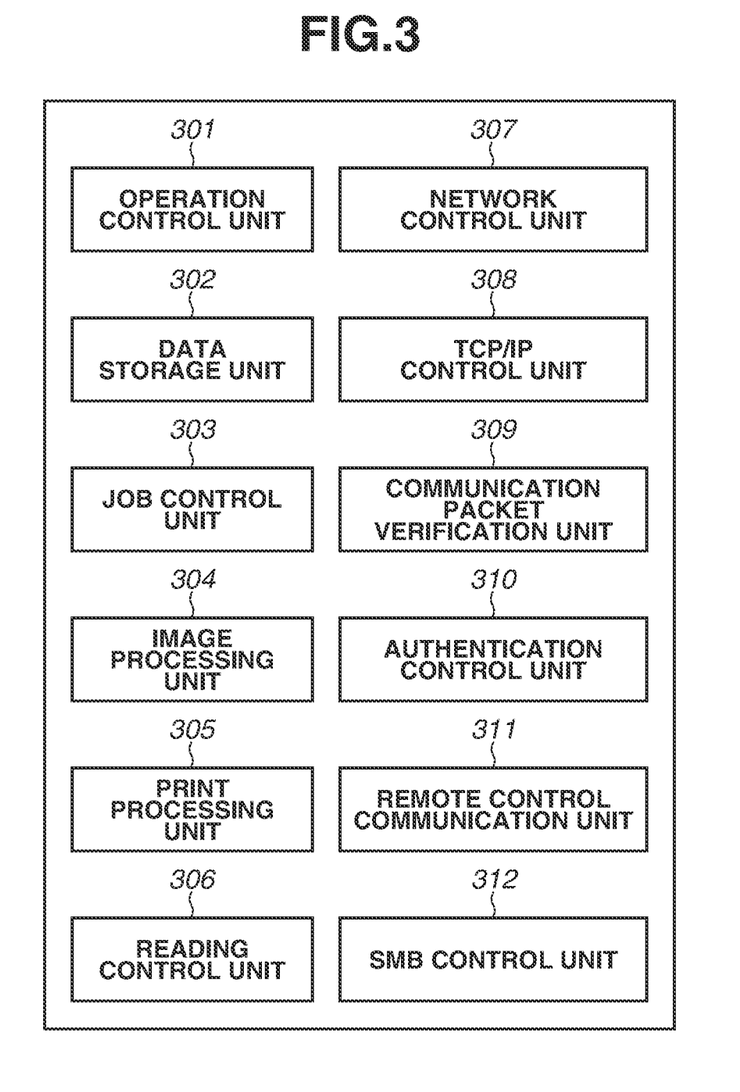
FIG. 3 is a block configuration diagram of software that is executed in the controller unit of the MFP.

FIG. 3 is a block diagram illustrating a structure of software which is executed by the controller unit 101 of the MFP 100. All software executed by the controller unit 101 is executed by the CPU 201 after the CPU 201 reads a program stored in the Flash ROM 211 into the DRAM 202.

An operation control unit 301 displays a screen image for a user on the operation unit 102, detects a user operation, and executes processing in association with a portion on a screen, such as a button displayed on the screen. A data storage unit 302 stores and reads data in and from the Flash ROM 211 in response to a request from other control units. For example, in a case where a user wants to change some device settings, the operation control unit 301 detects an operation input to the operation unit 102 by the user, and the data storage unit 302 stores information about the operation as a setting value in the Flash ROM 211 in response to a request from the operation control unit 301. A job control unit 303 controls job execution in accordance with an instruction from other control units. An image processing unit 304 processes image data into a format suitable for each use in accordance with an instruction from the job control unit 303. A print processing unit 305 prints an image on a paper medium via the printer OF 207 and outputs the paper medium according to an instruction from the job control unit 303. A reading control unit 306 reads a set document via a scanner I/F 208 according to an instruction from the job control unit 303. A network control unit 307 performs network settings, such as an IP address, on a transmission control protocol (TCP)/IP control unit 308 at the time of system startup or the time of detecting a setting change in accordance with the setting value stored in the data storage unit 302. The TCP/IP control unit 308 performs transmission and reception processing for a network packet via the network OF 204 in accordance with an instruction from other control units.

A communication packet verification unit 309 verifies contents of a communication packet transmitted and received by the network control unit 307.

An authentication control unit 310 controls an authentication function for using the MFP 100. In a case where the operation control unit 301, a remote control communication unit 311, and a Server Message Block (SMB) control unit 312 need an authentication operation, the authentication control unit 310 performs actual authentication processing.

The SMB control unit 312 performs control related to file sharing using an SMB protocol. The SMB control unit 312 performs file operation control on the MFP 100 in a case where a document file stored in the data storage unit 302 is referenced from the PC 113.

Figure 4:
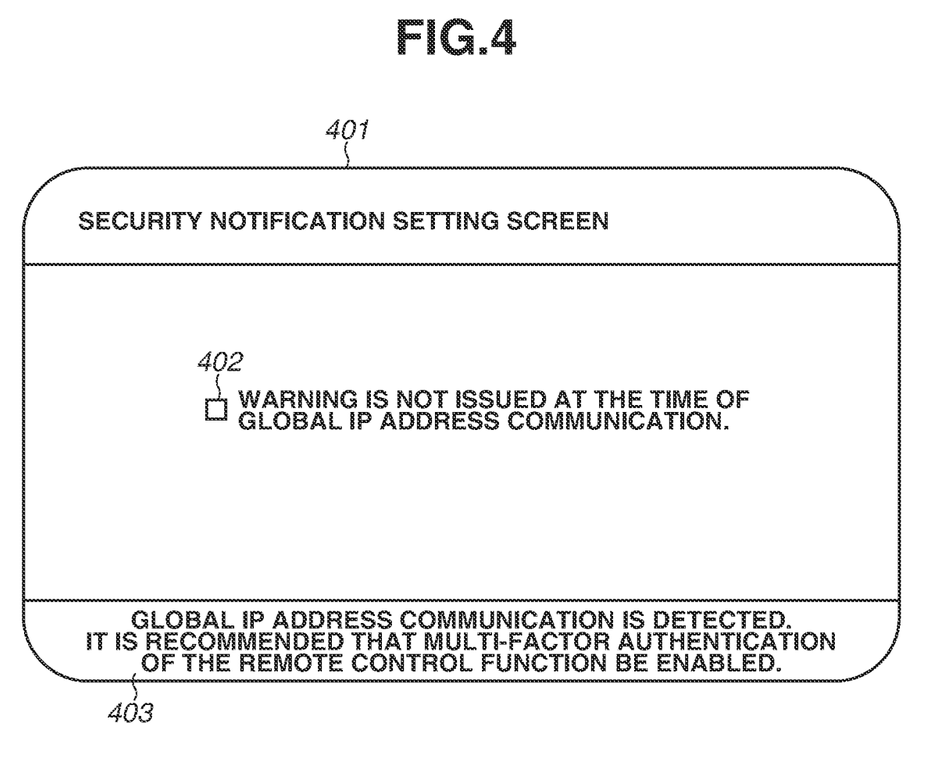
FIG. 4 illustrates a screen configuration related to a security notification function according to an embodiment.

FIG. 4 illustrates a security notification setting screen 401 displayed on the operation unit 102. This is a screen for a user to select whether to display a warning at the time of global IP address communication. A setting 402 for not issuing a warning at the time of global IP address communication enables setting as to whether to issue a security notification on an information notification portion 403 if the global IP address communication is detected. A value set with the setting 402 is stored in the data storage unit 302 and referenced in other processing. The information notification portion 403 is an area where a message is displayed in a case where the MFP 100 has information to notify the user. In addition to the security notification setting screen 401 illustrated in FIG. 4, the information notification portion 403 is also present on another screen on which various operations are performed, and security notification is issuable during another operation.

Figure 5:
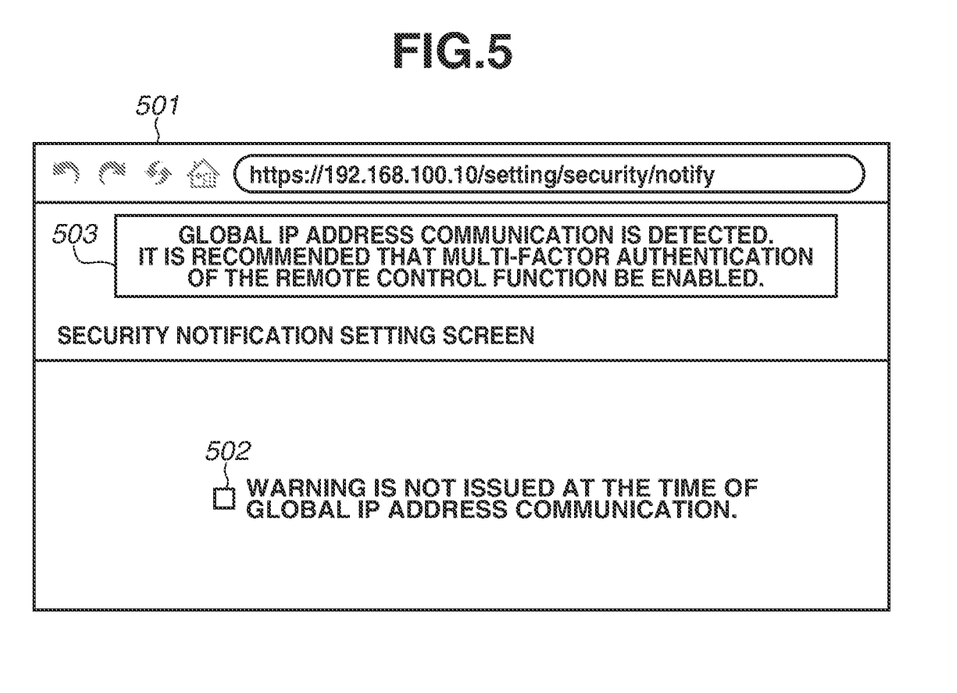
FIG. 5 illustrates a screen configuration related to a remote control function according to an embodiment.

FIG. 5 illustrates a security notification setting screen 501, which is transmitted from the remote control communication unit 311 and displayed on a web browser running on the PC 113. The security notification setting screen 501 provides a function equivalent to that of the security notification setting screen 401, but is operable by a user from the PC 113 at hand without going in front of the MFP 100. An information notification portion 503 is a message display area. A setting 502 for not issuing a warning at the time of global IP address communication enables setting as to whether to issue a message notification, as in the setting 402 for not issuing the warning at the time of global IP address communication. A value set with the setting 502 is stored in the data storage unit 302 and referenced in other processing.

Figure 6A:
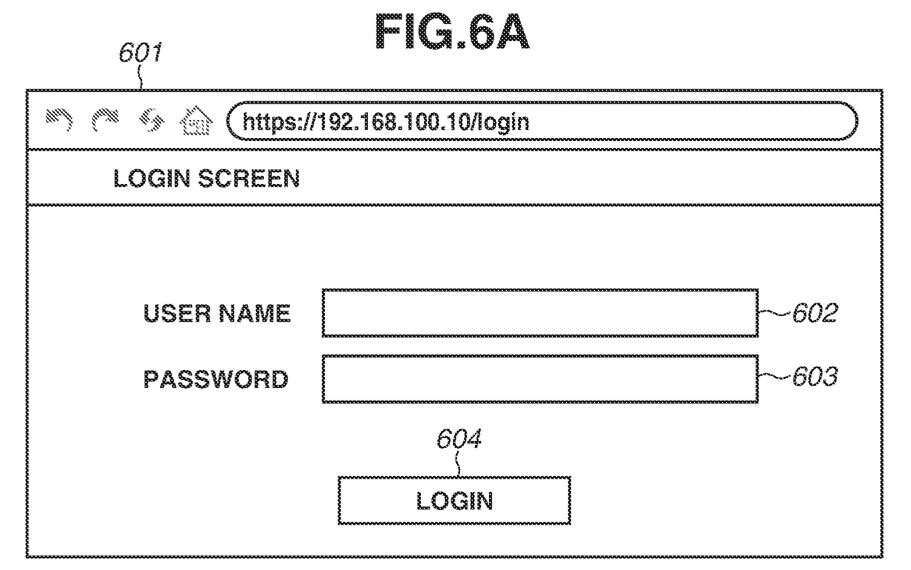
FIGS. 6A and 6B illustrate screen configurations related to a multi-factor authentication function according to an embodiment.
Figure 6B:
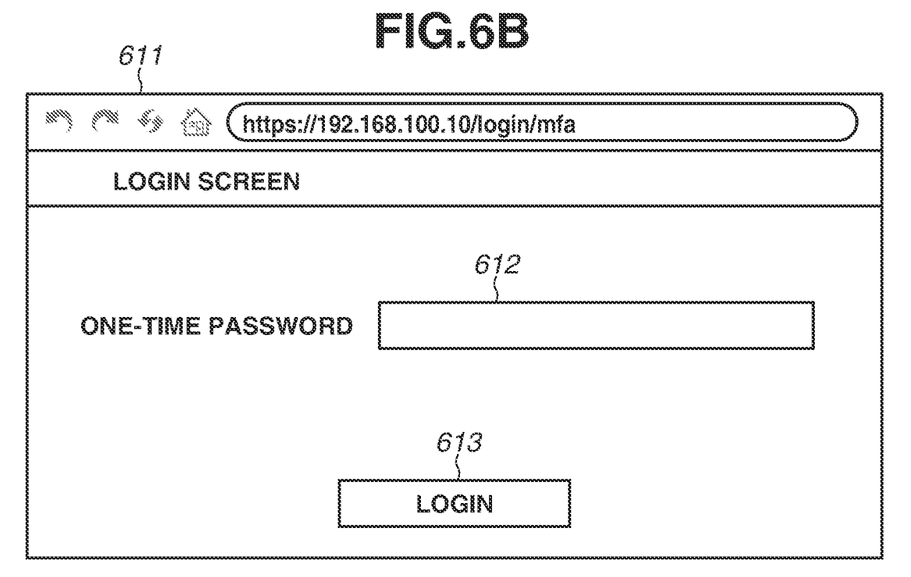

FIGS. 6A and 6B illustrate multi-factor authentication login screens used to connect to a remote control function from the PC 113. A login screen 601 is used for performing password authentication, which is knowledge information, as a first factor. A user name input area 602 is an area where a user name related to authentication is input using a keyboard of the PC 113. A password input area 603 is an area where a password is input. A login button 604 is used for performing password authentication based on the data input to the user name input area 602 and the password input area 603.

A login screen 611 is displayed if the password authentication is successful after the login button 604 is pressed. The login screen 611 is used for performing one-time password authentication for a mobile device, which is possession information, as a second factor. A one-time password input area 612 is used for inputting a one-time password displayed by token generation software of a mobile device associated in advance. A login button 613 is used for performing the one-time password authentication based on the information input to the one-time password input area 612.

By succeeding the authentication based on the two factors on the login screens 601 and 611, the user can use the remote control function provided by the MFP 100.

Other examples of possible information to be used for multi-factor authentication include biometric information in addition to the above-described knowledge information and possession information. According to the present embodiment, a password is used as the knowledge information, and a one-time password of a mobile device is used as the possession information, but the present disclosure is not limited to them. It is also possible to use a secret question or the like as the knowledge information, application authentication and an integrated circuit (IC) card as the possession information, and a fingerprint and face authentication as the biometric information.

Figure 7A:
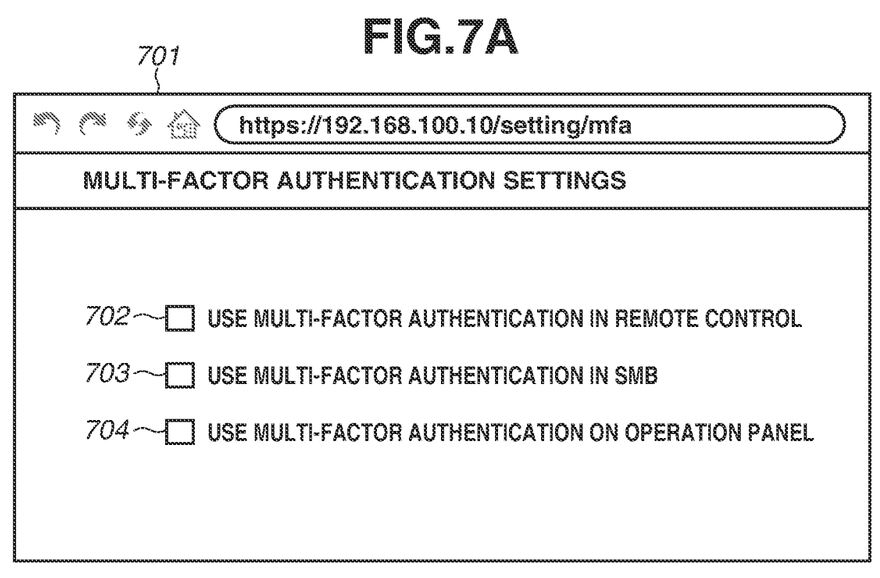
FIGS. 7A and 7B illustrate screen configurations related to a multi-factor authentication enabling function according to an embodiment.
Figure 7B:
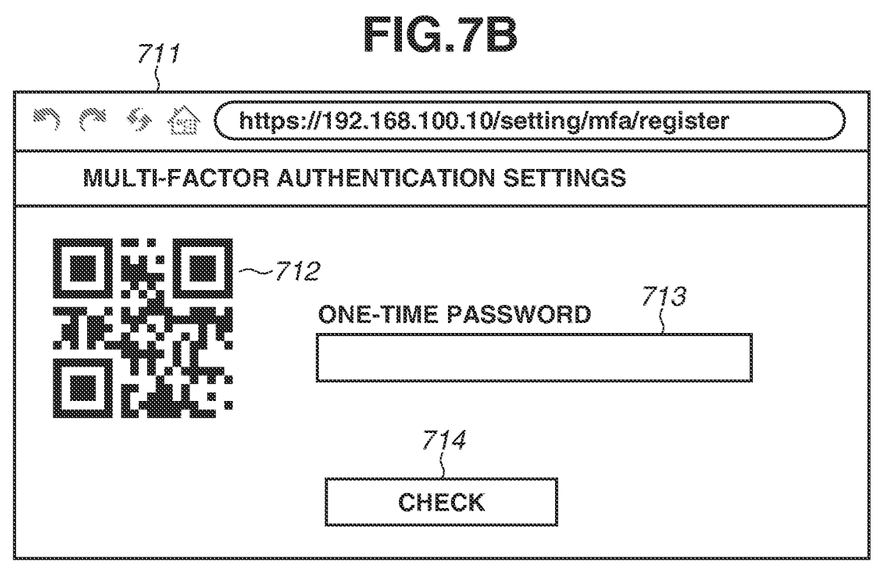

FIGS. 7A and 7B illustrate multi-factor authentication setting screens for enabling the multi-factor authentication using the remote control function from the PC 113. A multi-factor authentication setting screen 701 is a screen for selecting whether to use the multi-factor authentication for each of remote control, SMB, and an operation panel.

A setting 702, "use multi-factor authentication in remote control", is used to set use of the multi-factor authentication in the remote control. A setting 703, "use multi-factor authentication in SMB", is used to set use of the multi-factor authentication in the SMB. A setting 704, "use multi-factor authentication in the operation panel", is used to set use of the multi-factor authentication in the operation panel. If any of check boxes of the settings 702, 703, and 704 is enabled, a multi-factor authentication setting screen 711 is displayed.

The multi-factor authentication setting screen 711 is a screen for associating a mobile device owned by the user with the MFP 100 in advance in order to use the mobile device for the multi-factor authentication. A Quick Response (QR) Code® 712 is an area for displaying a QR Code® for the mobile device to read information to be used to associate the mobile device with the MFP 100 via a camera function. A one-time password input area 713 is used for inputting a one-time password generated by the token generation software of the mobile device after the mobile device reads the QR Code® displayed on the QR Code® 712. A check button 714 is used to check whether the association is successful based on the information input to the one-time password input area 713. If the association is successful, the data storage unit 302 stores association information and also stores information indicating that one of the settings 702, 703, and 704 is enabled.

A one-time password used according to the present embodiment will be described. A Time-Based One-Time Password (TOTP) specified in Request for Comments (RFC) 6238 is useable as a method of generating a one-time password. In this method, a TOTP secret generated for each user and time information are used to generate a one-time password, which is authentication information. The TOTP secret is random numbers. In recent years, mobile applications (smartphone applications) compatible with TOTP have become widely used. For example, there are Google Authenticator (registered trademark) of Google LLC and Microsoft Authenticator (registered trademark) of Microsoft Corporation. A TOTP secret is stored in a mobile application by registering the TOTP secret as a character string in the mobile application compatible with TOTP or by capturing a two-dimensional code including TOTP secret information with the mobile application. Thus, the TOTP secret is shared between a TOTP secret issuer and the mobile application. The mobile application compatible with TOTP generates a one-time password based on the TOTP secret acquired from the QR Code® and time information. In addition to the mobile application compatible with TOTP, there is a plug-in compatible with TOTP that is installable as an extension of a PC web browser.

In the present embodiment, a TOTP secret issuer is the MFP 100. In the present embodiment, each user who uses the MFP 100 uses a mobile application or a plug-in of a web browser that are compatible with TOTP. According to the present embodiment, the MFP 100 issues the TOTP secret. The QR Code® including the TOTP secret issued by the MFP 100 is displayed on the multi-factor authentication setting screen 711. The mobile device of the user reads the QR Code® so that the TOTP secret is shared with the MFP 100 and that the mobile device generates a one-time password based on the shared TOTP secret and time information. The MFP 100 uses the one-time password input to the one-time password input area 713 to check whether the association is successful. More specifically, the MFP 100 uses the method defined in RFC 6238 to generate a one-time password using the current time information and the TOTP secret and checks the generated one-time password against the input one-time password. The one-time password changes every 30 seconds. In order to allow a difference in time settings between the mobile device and the MFP 100, one-time passwords 30 seconds before and 30 seconds after may also be calculated and compared with a plurality of one-time passwords for verification. If the one-time password verification is successful, the MFP 100 associates the TOTP secret with a user account, stores it in the data storage unit 302, and completes enabling processing of the one-time password.

At the time of login, the MFP 100 prompts a user to input the one-time password via the login screen 611. The MFP 100 then checks the input one-time password against the one-time password calculated from the time information and the TOTP secret and authenticates the one-time password. In general, a one-time password generated using software, such as a mobile application and a plug-in of the web browser, is referred to as a software token. An authentication method using a software token is referred to as software token authentication. Second factor authentication of the multi-factor authentication according to the present embodiment is authentication by verifying the token based on the one-time password described above.

A multi-factor authentication enabling target is selected on the multi-factor authentication setting screen 701 and is associated with the mobile device on the multi-factor authentication setting screen 711, so that multi-factor authentication is enabled.

Figure 8:
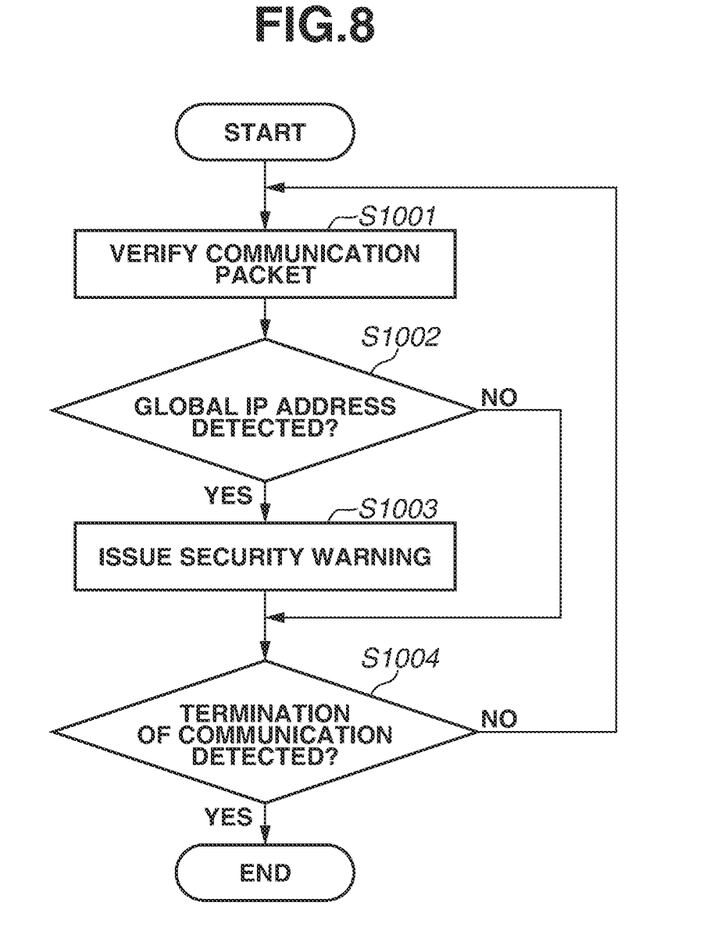
FIG. 8 is a flowchart illustrating processing that is executed in the MFP according to an embodiment.

Processing by the MFP 100 for detecting global IP address communication and issuing a warning to a user is described with reference to FIG. 8. Each step in the processing performed by the MFP 100 in FIG. 8 is executed as arithmetic processing of the CPU 201 after a program stored in the Flash ROM 211 is read into the DRAM 202.

If the MFP 100 starts communication, the processing in the present flowchart is started in parallel with a process for an original communication purpose.

In step S1001, the communication packet verification unit 309 of the MFP 100 detects transmission and reception of a communication packet and verifies the communication packet. As a detail for the verification, the communication packet verification unit 309 verifies whether an IP address described in a source address portion and a destination address portion in an IP header is a global IP address. The global IP address is determined based on whether the IP address is included in a global IP address range. The global IP address range is one of those indicated in Table 1.

TABLE 1

| |
|---|
| 1.0.0.0-9.255.255.255 |
| 11.0.0.0-126.255.255.255 |
| 128.0.0.0-172.15.255.255 |
| 172.32.0.0-191.255.255.255 |
| 192.0.0.0-192.167.255.255 |
| 192.169.0.0-223.255.255.255 |

As a detection target, both directions of transmission and reception, both of the source address portion and the destination address portion, and all communication ports may be checked. This configuration comprehensively checks the presence of a node having the global IP address in the network, and is effective. According to the present embodiment, the detection target is limited. Limiting conditions are that, the source address portion of the packet in the reception direction viewed from the MFP 100, and the communication ports are Hypertext Transfer Protocol (HTTP) ports 80 and 443 of TCP. This is because, assuming an attack on the remote control function from the outside, the detection target meets these conditions. In other words, the detection target is limited to a communication packet passing through a port number corresponding to a predetermined protocol used for performing the remote control. In a case where the multi-factor authentication is performed on a communication path other than the remote control function, a communication pattern corresponding to the communication path may be added as a condition. In the present embodiment, the SMB applies to this communication path. The port number, which serves as the communication path using the SMB protocol, is also treated as a verification target of the communication packet.

In step S1002, the communication packet verification unit 309 of the MFP 100 determines whether the global IP address is detected in step S1001. If the communication packet verification unit 309 determines that the global IP address is detected (YES in step S1002), the processing proceeds to step S1003. If not (NO in step S1002), the processing proceeds to step S1004.

In step S1003, the MFP 100 issues a security warning. According to the present embodiment, there are three possible notification methods: a notification in the information notification portion 403 displayed on the operation unit 102 of the MFP 100; a notification in the information notification portion 503 displayed on the web browser of the PC 113; and a notification to the management system 121. At least one of these three methods is used to issue a warning.

In the present embodiment, the notification in the information notification portions 403 and 503 is performed in a case where the multi-factor authentication of the remote control function of the MFP 100 is not enabled and a setting of not performing this notification is not set. In other words, the notification is performed in a case where the setting 702 is off on the multi-factor authentication setting screen 701, and the setting 402 on the security notification setting screen 401 and the setting 502 on the security notification setting screen 501 are off. If the setting 702 is on or the settings 402 and 502 are on, the notification is not performed. This is a configuration to avoid an excessive warning depending on whether the multi-factor authentication is set to be enabled or the user wishes not to issue a warning. In contrast, the notification to the management system 121 is performed irrespective of whether the settings 702, 402, and 502 are on or off. Each notification method will be described below.

In response to receiving information indicating that the global IP address is detected in step S1002, the operation control unit 301 of the MFP 100 checks the setting values of the settings 702, 402, and 502 stored in the data storage unit 302. In a case where the setting value of the setting 702 indicates off, and the setting values of settings 402 and 502 also indicate off, the operation control unit 301 notifies the information notification portion 403 of a warning message. More specifically, a message indicating, for example, "Global IP address communication is detected. It is recommended that the multi-factor authentication of the remote control function be enabled" is notified.

In response to receiving the information indicating that the global IP address is detected in step S1002, the remote control communication unit 311 checks the setting values of the settings 702, 402, and 502 stored in the data storage unit 302. In a case where the setting value of the setting 702 indicates off, and the setting values of the settings 402 and 502 also indicate off, the remote control communication unit 311 transmits to the PC 113 an instruction to notify the information notification portion 503 of a warning. The PC 113 that receives the instruction displays the warning message prompting the user to enable the multi-factor authentication for the remote control function in the information notification portion 503 on the screen displayed on the web browser running on the PC 113.

In response to receiving the information indicating that the global IP address is detected in step S1002, the network control unit 307 transmits to the management system 121 a notification indicating that the MFP 100 uses a non-recommended protocol. The management system 121 that has received the notification displays the received notification on a management system browsing screen for the web browser.

Here, a configuration may be adopted with which a security risk measure is widely implemented by prompting the user to enable the multi-factor authentication for other authentication paths, such as SMB and the operation panel, even if the authentication path for which the global IP address has been detected is only the remote control function. Alternatively, in the verification of the communication packet in step S1001, the communication port which serves as a communication path using the SMB protocol may also be treated as the verification target for the communication packet. In a case where the global IP address is detected in the communication packet, enabling the multi-factor authentication of the SMB may be prompted. At this time, the conditions for displaying the warning in the information notification portions 403 and 503 may be that the setting 703 is off and the settings 402 and 502 are off.

According to the present embodiment, after displaying the warning, the information indicating that the global IP address is detected in step S1001 is stored in the data storage unit 302 as a security log for future reference. The log may be transmitted separately to a security information and event management (STEM) server as a security log. Information about on/off of the setting related to the multi-factor authentication set on the multi-factor authentication setting screen 701 is also stored separately in the data storage unit 302 as a security log if the setting value is changed.

In step S1004, if termination of communication is detected (YES in step S1004), the MFP 100 terminates the processing in the flowchart, and if the communication is not terminated yet (NO in step S1004), the MFP 100 returns the processing to step S1001 and starts verification of a next communication packet.

According to the present embodiment, the warning issued in step S1003 will continue to be displayed until the MFP 100 is restarted. If the MFP 100 is restarted, the warning prompting the user to enable the multi-factor authentication is not displayed in the information notification portions 403 and 503, until the processing in the flowchart in FIG. 8 is started after that and then the processing in step S1003 is performed to display the warning. If a multi-factor authentication setting is performed, the MFP 100 is restarted to reflect the input setting in the MFP 100. Thus, in a case where the multi-factor authentication setting is enabled, the notifications in the information notification portions 403 and 503 are not displayed after the restart.

Through the above-described processing, it is possible to appropriately issue a security warning and prompt a user to take a measure only in a usage environment where the multi-factor authentication is particularly to be performed.

While the communication packet is verified in step S1001 and the notification is issued if the global IP address is detected in the present embodiment, a method for detecting a global IP address is not limited to verification of a communication packet. For example, it is possible to check whether the global IP address is set for itself, and to issue a warning if the global IP address is set. At this time, a warning may be issued in a case where the global IP address is set and the multi-factor authentication is not set for itself, and the warning may not be issued in a case where the global IP address is not set for itself. As with the setting 402, it may be configured so as to enable a user to select a setting of not issuing a warning, and the warning may not be issued with the setting enabled.

The MFP 100 also includes a single-factor authentication setting in addition to the multi-factor authentication setting described above as an authentication setting. Examples of single-factor authentication include user authentication using a password. Notifications on the information notification portions 403 and 503 are provided with the multi-factor authentication setting set off, but in a case where a single-factor authentication setting is set on, it may be further requested to turn on (enable) the multi-factor authentication setting. According to the present embodiment, a warning prompting the user to enable the multi-factor authentication is issued. Alternatively, the user may be prompted to enable a setting related to another authentication method. For example, in a case where a single-factor authentication setting is off, a user may be requested to turn on the single-factor authentication setting.

A second embodiment of the present disclosure will be described below with reference to the accompanying drawings. In the present embodiment, a configuration is described in which, in a case where communication including a global IP address in a packet header is detected after a warning that the global IP address is set for itself at the time of setting an IP address, security notification is separately issued to a user. An information processing apparatus according to the present disclosure is not limited to an MFP. The information processing apparatus may be, for example, a PC, a server, or the like that has a multi-factor authentication function.

Regarding FIGS. 1, 2, 4, and 5, the present embodiment has the same configuration as the first embodiment. Regarding FIG. 3, it is not illustrated, but the MFP 100 further includes a setting check unit that checks a setting of an IP address of the MFP 100 itself.

Figure 9:
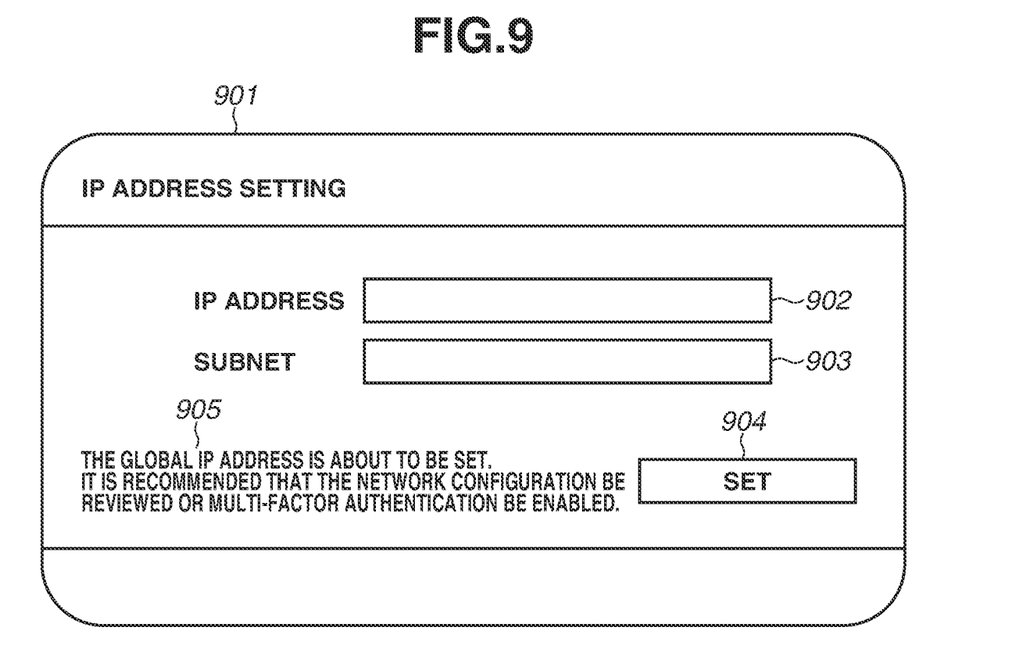
FIG. 9 illustrates a screen configuration related to an Internet Protocol (IP) address setting function according to an embodiment.

FIG. 9 illustrates an IP address setting screen 901 displayed on the operation unit 102. The IP address setting screen 901 is used for setting the IP address for the MFP 100 to operate. An IP address input area 902 is used for inputting the IP address. A subnet input area 903 is used for inputting a subnet. An IP address warning area 905 is used for providing a message if notification is necessary based on information input to the IP address input area 902. In a case where the global IP address is input to the IP address input area 902, a warning is displayed on the IP address warning area 905. More specifically, the operation control unit 301 displays a warning message, as illustrated in FIG. 9, that prompts a user either to review a network configuration and cancel the input of the global IP address, or to enable the multi-factor authentication and use the global IP address safely.

In other words, the operation control unit 301 displays the IP address setting screen 901 including the warning about multi-factor authentication and network configuration review. Pressing a setting button 904 stores the values input to the IP address input area 902 and the subnet input area 903 in the data storage unit 302, thus enabling the stored values at the time of starting network connection.

In FIG. 9, the warning about multi-factor authentication and network configuration review may be displayed only in a case where the global IP address is input and the multi-factor authentication is not enabled.

Figure 10:
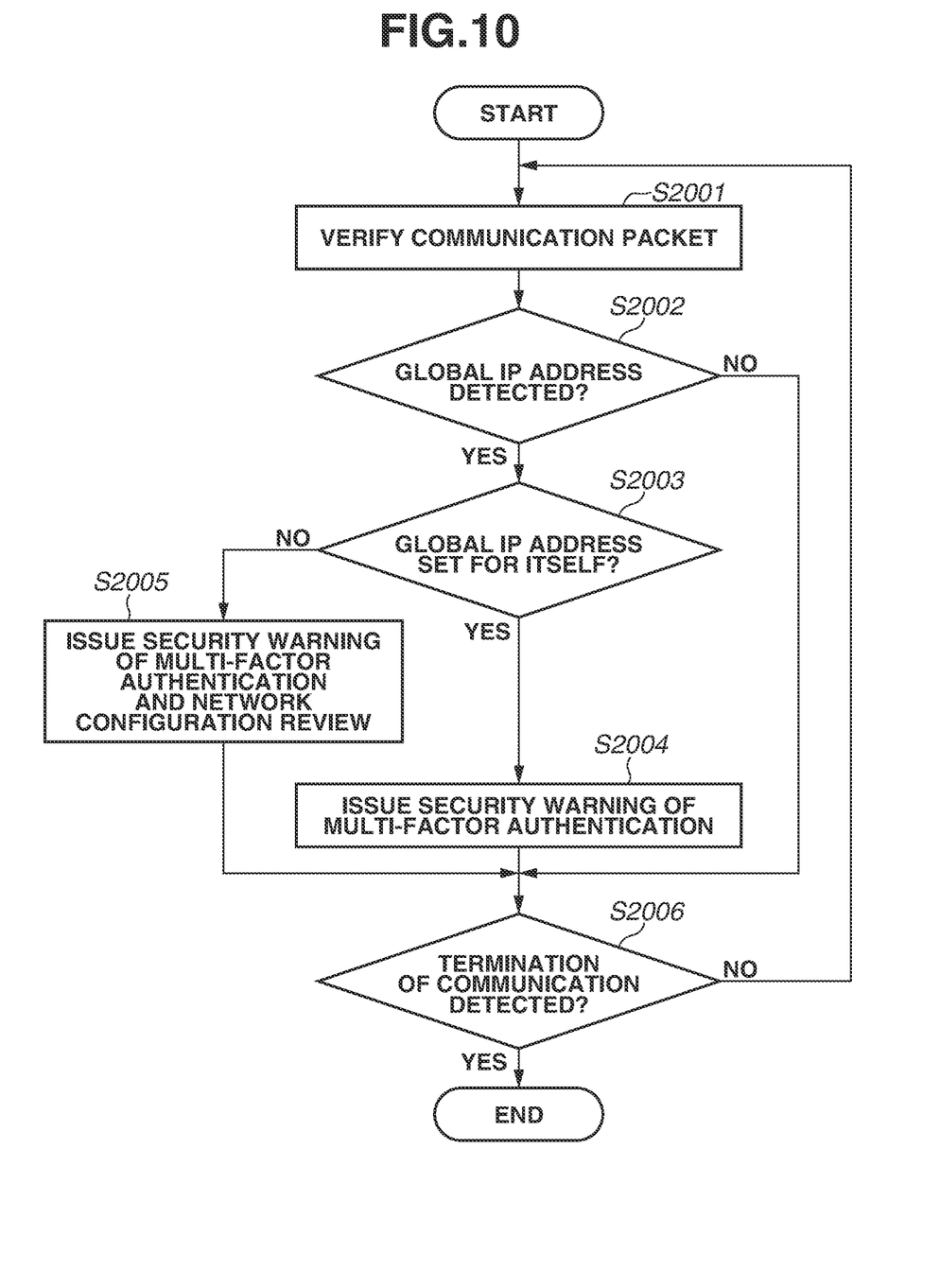
FIG. 10 is a flowchart illustrating processing executed in the MFP according to an embodiment.

A description will be provided of processing which is performed by the MFP 100 for detecting global IP address communication and notifying a user with reference to FIG. 10. All processing performed by the MFP 100 in FIG. 10 is executed as arithmetic processing by the CPU 201 after a program stored in the Flash ROM 211 is read into the DRAM 202.

If the MFP 100 starts communication, the processing in the present flowchart is started in parallel with a process for an original communication purpose.

In step S2001, the communication packet verification unit 309 of the MFP 100 detects transmission and reception of a communication packet and verifies the communication packet. In step S2002, the communication packet verification unit 309 of the MFP 100 determines whether the global IP address is detected in step S2001. If the communication packet verification unit 309 determines that the global IP address is detected (YES in step S2002), the processing proceeds to step S2003. If the communication packet verification unit 309 determines that the global IP address is not detected (NO in step S2002), the processing proceeds to step S2006. Specific operations in steps S2001 and S2002 are similar to those in steps S1001 and S1002 in the first embodiment.

In step S2003, the setting check unit of the MFP 100 determines whether the global IP address is set for the own apparatus. The setting check unit checks whether the value input to the IP address input area 902 and stored in the data storage unit 302 is the global IP address. If the setting check unit determines that the global IP address is set (YES in step S2003), the processing proceeds to step S2004. If the setting check unit determines that the global IP address is not set (NO in step S2003), the processing proceeds to step S2005.

In step S2004, the MFP 100 issues a security warning for the multi-factor authentication. As in the first embodiment, notifications are issued with the information notification portions 403 and 503, and also by the management system 121. A message prompting the user to enable the multi-factor authentication is displayed in each notification portion. Specific notification processing and details of the message are similar to those according to the first embodiment. In the present embodiment, the notifications of the warning in the information notification portions 403 and 503 are also provided in a case where the multi-factor authentication of the remote control function of the MFP 100 is not enabled and that a setting of not performing the notification is not set. The operation in step S2004 is performed only in a case where the global IP address is set for the MFP 100 in step S2003. Thus, it can be said that the operation in step S2004 is performed after the warning about multi-factor authentication and network configuration review has been already displayed in the IP address warning area 905 in the IP address setting screen 901. The user uses the current configuration with a clear intention, even though the user is prompted to review the network configuration at the time of setting the global IP address to the MFP 100, so that security is to be ensured by the multi-factor authentication.

In step S2005, the MFP 100 issues a security warning for multi-factor authentication and network configuration review. A message prompting a user to enable the multi-factor authentication and review the network configuration is displayed in the information notification portions 403 and 503 and by the management system 121 in a manner similar to that in step S2004. Since the global IP address is not set for the MFP 100, ensuring safety by reviewing the network configuration is more likely to be appropriate.

In the present embodiment, after displaying the warning, the information indicating that the global IP address is detected in step S2001 is also stored in the data storage unit 302 as a security log for future reference.

In step S2006, if termination of communication is detected (YES in step S2006), the MFP 100 terminates the processing of the flowchart. If the communication is not terminated yet (NO in step S2006), the MFP 100 returns the processing to step S2001 and starts verification of a next communication packet.

With the above-described processing, it is possible to appropriately issue a security warning and prompt a user to take a measure by combining processing of issuing a warning at the time of setting the global IP address for the device itself and processing for detecting and notifying global IP address communication.

Other Embodiments

The present disclosure can also be realized by processing in which a program for realizing one or more functions of each of the above-described embodiments is supplied to a system or an apparatus via a network or a storage medium and one or more processor in a computer of the system or the apparatus reads and executes the program. The present disclosure can also be realized by a circuit (for example, an application specific integrated circuit (ASIC) and a field programmable gate array (FPGA)) that realizes one or more functions.

The information processing apparatus according to the present disclosure enables provision of a mechanism for appropriately issuing a warning about authentication settings in consideration of a network environment of an information processing apparatus.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-138906, filed Sep. 1, 2022, which is hereby incorporated by reference herein in its entirety.

What is claimed is:

1. An information processing apparatus configured to communicate with an external information processing apparatus, the information processing apparatus being configured to:
    determine, based on the information processing apparatus having communicated with the external information processing apparatus, whether information indicating a global Internet Protocol address is included in an Internet Protocol header of a communication packet in the communication, the communication packet passing through a port whose number corresponds to a predetermined protocol; and
    perform control to issue a warning about a setting related to multi-factor authentication for the predetermined protocol in a case where it is determined that the information indicating the global Internet Protocol address is included, and the setting related to the multi-factor authentication for the predetermined protocol is not made on the information processing apparatus, and so as not to issue the warning about the setting related to the multi-factor authentication for the predetermined protocol in a case where it is determined that the information indicating the global Internet Protocol address is not included.

2. The information processing apparatus according to claim 1, wherein information to be used in the multi-factor authentication includes at least two of knowledge information, possession information, and biometric information.

3. The information processing apparatus according to claim 1,
    wherein the information processing apparatus includes an image processing apparatus that includes at least one of a scanner and a printer, and
    wherein authentication used in the multi-factor authentication includes two types of authentication: password authentication using authentication information about a user, and authentication through verification of a token based on a one-time password generated by a terminal, owned by the user, reading a two-dimensional code including a secret issued by the information processing apparatus.

4. The information processing apparatus according to claim 1,
    wherein the information processing apparatus is configured to perform a remote control via an operation unit of an external apparatus, and
    wherein the predetermined protocol includes a protocol to be used for performing the remote control.

5. The information processing apparatus according to claim 4, wherein the remote control includes making admin settings relating to a network and security via a remote user interface displayed on the operation unit of the external apparatus.

6. The information processing apparatus according to claim 4,
    wherein the information processing apparatus includes a scanner and is configured to transmit data acquired by scanning using the scanner, and
    wherein the remote control includes performing at least one of adding, registering, deleting, and editing an address book including an e-mail address that is settable to a transmission destination to which the data is to be transmitted.

7. The information processing apparatus according to claim 4, being further configured to:
    perform multi-factor authentication for a Server Message Block protocol; and
    issue a warning about a multi-factor authentication setting for the Server Message Block protocol along with a warning about a multi-factor authentication setting for the protocol to be used for performing the remote control.

8. The information processing apparatus according to claim 4, being further configured to:
    perform multi-factor authentication for an operation unit of the information processing apparatus; and
    issue a warning about a multi-factor authentication setting for the operation unit of the information processing apparatus along with a warning about a multi-factor authentication setting for the protocol to be used for performing the remote control.

9. The information processing apparatus according to claim 1, being further configured to:
    set whether to issue the warning about the setting related to the multi-factor authentication for the predetermined protocol; and
    perform control so as not to issue the warning irrespective of whether the information indicating the global Internet Protocol address has been determined to be included in a case where the warning is set so as not to be issued.

10. The information processing apparatus according to claim 1, being further configured to perform, in a case where it is determined that the information indicating the global Internet Protocol address is included, and the setting related to the multi-factor authentication for the predetermined protocol is not performed, control to issue the warning about the setting related to the multi-factor authentication for the predetermined protocol via at least one of an operation unit of the information processing apparatus and an operation unit of an external apparatus.

11. The information processing apparatus according to claim 1, being further configured to:
    perform setting an Internet Protocol address of the information processing apparatus; and
    issue a warning about the setting related to the multi-factor authentication for the predetermined protocol and reviewing a network configuration of the information processing apparatus, based on the global Internet Protocol address having been set to the Internet Protocol address in the information processing apparatus,
    wherein, in a case where it is determined that the information indicating the global Internet Protocol address is included, and the setting related to the multi-factor authentication for the predetermined protocol is not made, the information processing apparatus issues the warning about the setting related to the multi-factor authentication for the predetermined protocol.

12. The information processing apparatus according to claim 1, being further configured to:
    issue the warning about the setting related to the multi-factor authentication for the predetermined protocol in a case where it is determined that the information indicating the global Internet Protocol address is included, the setting related to the multi-factor authentication for the predetermined protocol is not made, and the global Internet Protocol address is set for the information processing apparatus; and issue a warning about the setting related to the multi-factor authentication for the predetermined protocol and reviewing a network configuration of the information processing apparatus in a case where it is determined that the information indicating the global Internet Protocol address is included, the setting related to the multi-factor authentication for the predetermined protocol is not made, and the global Internet Protocol address is not set for the information processing apparatus.

13. The information processing apparatus according to claim 1, being further configured to store, in a case where it is determined that the information indicating the global Internet Protocol address is included, the determined information as a log.

14. The information processing apparatus according to claim 1, wherein the information processing apparatus includes an image processing apparatus including at least one of a scanner and a printer.

15. A method for controlling an information processing apparatus configured to communicate with an external information processing apparatus, the method comprising:

determining, based on the information processing apparatus having communicated with the external information processing apparatus, whether information indicating a global Internet Protocol address is included in an Internet Protocol header of a communication packet in the communication, the communication packet passing through a port whose number corresponds to a predetermined protocol; and performing control to issue a warning about a setting related to multi-factor authentication for the predetermined protocol in a case where it is determined that the information indicating the global Internet Protocol address is included, and the setting related to the multi-factor authentication for the predetermined protocol is not made on the information processing apparatus, and so as not to issue the warning about the setting related to the multi-factor authentication for the predetermined protocol in a case where it is determined that the information indicating the global Internet Protocol address is not included.

16. A non-transitory computer-readable storage medium storing a computer program for executing a method for controlling an information processing apparatus configured to communicate with an external information processing apparatus, the method comprising:

determining, based on the information processing apparatus having communicated with the external information processing apparatus, whether information indicating a global Internet Protocol address is included in an Internet Protocol header of a communication packet in the communication, the communication packet passing through a port whose number corresponds to a predetermined protocol; and performing control to issue a warning about a setting related to multi-factor authentication for the predetermined protocol in a case where it is determined that the information indicating the global Internet Protocol address is included, and the setting related to the multi-factor authentication for the predetermined protocol is not made on the information processing apparatus, and so as not to issue the warning about the setting related to the multi-factor authentication for the predetermined protocol in a case where it is determined that the information indicating the global Internet Protocol address is not included.

* * * * *